United States Patent [19]

Fillar et al.

[11] Patent Number: 4,863,418
[45] Date of Patent: Sep. 5, 1989

[54] NON-METALLIC CHAIN INCLUDING WOUND COMPOSITE CHAIN LINKS AND MOLDED PINS

[75] Inventors: John A. Fillar, New Berlin; Thomas J. Casper, Waukesha; James H. Wiegand, Franklin, all of Wis.

[73] Assignee: Envirex Inc., Waukesha, Wis.

[21] Appl. No.: 310,223

[22] Filed: Feb. 13, 1989

[51] Int. Cl.⁴ .............................................. F16G 13/02
[52] U.S. Cl. ......................................... 474/207; 59/7; 59/59; 474/223
[58] Field of Search ............................... 474/207–209, 474/219–225; 59/4, 5, 7, 9, 78, 84, 85, 88

[56] References Cited

U.S. PATENT DOCUMENTS

| | | | |
|---|---|---|---|
| 3,153,898 | 10/1964 | Gerhardt | 59/84 |
| 3,231,069 | 1/1966 | Lanham | 474/207 X |
| 3,733,811 | 5/1973 | Florjancic | 59/35 |
| 4,123,947 | 11/1978 | Smith et al. | 74/245 |
| 4,250,764 | 2/1981 | Grant | 474/207 |
| 4,272,952 | 6/1981 | Graham | 59/84 |
| 4,729,754 | 3/1988 | Thuerman | 474/207 |
| 4,810,238 | 3/1989 | Bazdernik | 474/207 |

FOREIGN PATENT DOCUMENTS 1135721 8/1962 Fed. Rep. of Germany .
3408295 10/1985 Fed. Rep. of Germany .

*Primary Examiner*—Thuy M. Bui
*Attorney, Agent, or Firm*—Michael, Best & Friedrich

[57] ABSTRACT

A link assembly for a lightweight, non-metallic, conveyor or load transmission chain having significantly greater strength and other performance improvements compared to previous non-metallic chain links is disclosed. Each link assembly includes a pair of identical sidebars each comprised of high-strength filamentary material wound in an elongated loop configuration and fixed in a matrix of hardened resin and a connecting pin having a stiff reinforced composite core and a surrounding sleeve of low friction wear resistant material.

10 Claims, 1 Drawing Sheet

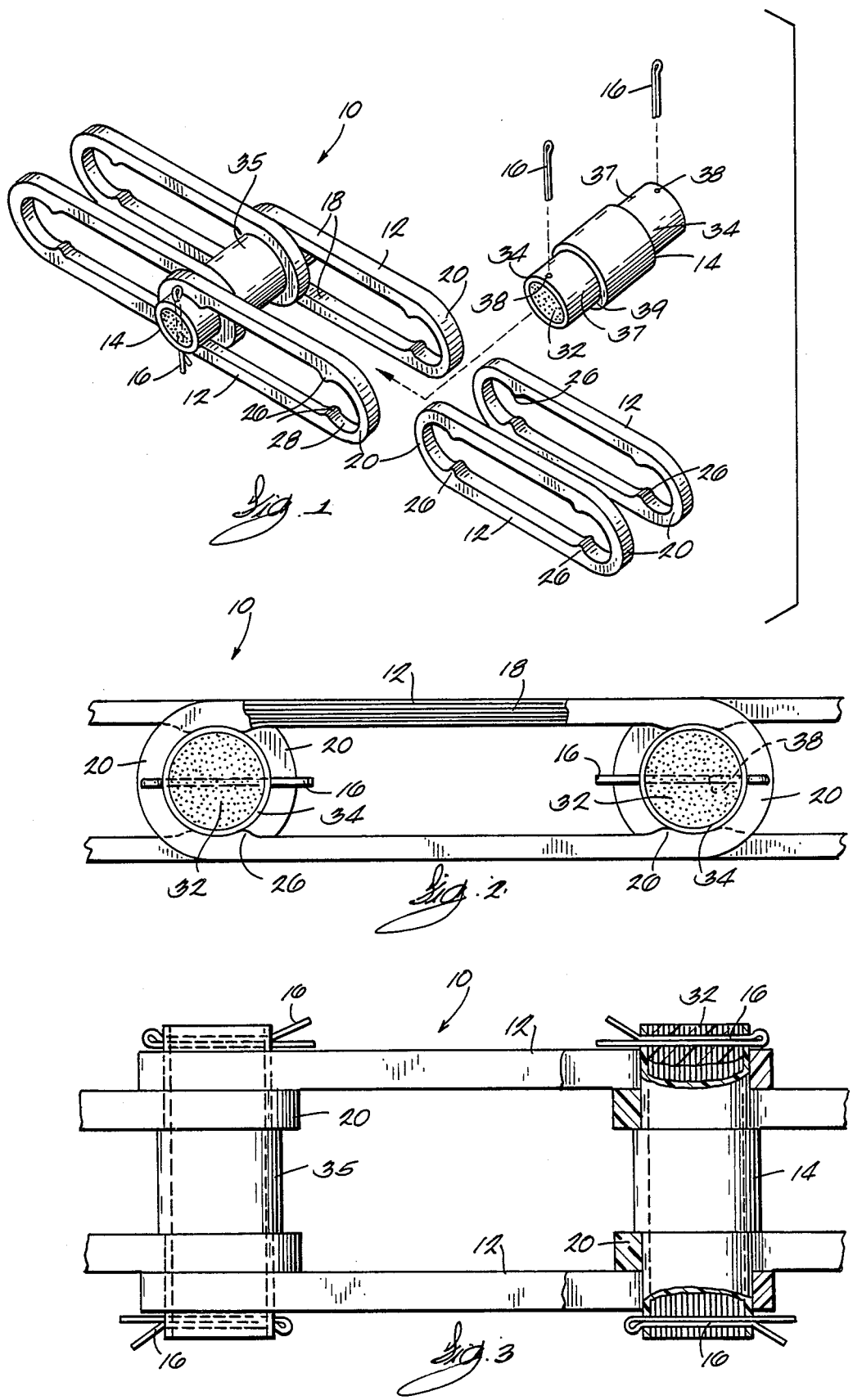

NON-METALLIC CHAIN INCLUDING WOUND COMPOSITE CHAIN LINKS AND MOLDED PINS

FIELD OF THE INVENTION

This invention relates to non-metallic, high-load transmission or conveyor chain and, more particularly, to an improved, non-metallic, high strength-to-weight ratio chain link assembly especially well suited for sludge collector chain used in sewage treatment plants.

Attention is directed to U.S. Pat. application Ser. No. 840,116, filed Mar. 13, 1986, and assigned to the assignee of this application.

BACKGROUND OF THE INVENTION

There is a broad range of applications for power transmission or conveyor chain made of an economical, corrosion resistant material, having a very high strength-to-weight ratio. For example, in grain and cement elevators, the weight of the chain used to lift bulk materials is itself a major contributor to the load on itself and the drive system. In food processing or underwater operations, corrosion resistance is an essential requirement.

There has also been a long standing need for an improved sludge collector chain to operate under conditions of the hostile corrosive embodiment of sludge collectors and where heavy chain loads are experienced. It is also important in those applications that the chain have dimensional stability. Sludge collector chains are typically employed in pairs of parallel strands which between them support elongated flights. The flights travel under the pull of the chains to scrape the accumulated sludge settled along the bottom of a sewage treatment tank. Such tanks typically range in length up to 350 feet, and in depth up to 15 to 20 feet. The sprocket driven, submerged chains for these tanks are quite long, endure heavy tensile loads and operate in a corrosive environment.

Initially sludge collector chain was formed of malleable cast iron which was very heavy and unwieldly, required considerable power to drive it, and was vulnerable to corrosion by most wastewater. Such cast chain is still used in many larger settling tanks because of the heretofore unavailability of a non-metallic chain having adequate pulling strength.

More recently chain manufacturers have struggled to replace the heavy cast metal with corrosion resistant non-metallic materials, particularly plastics. Plastic chain offers the advantage of lower weight which thereby reduces chain load, power consumption, wear, and installation costs. Although a few of these plastic chains, representatives of which are discussed below, have proven acceptable in some smaller sludge collector applications, none of the heretofore commercially available ones have had enough strength to operate in the larger tanks, for example, tanks having a length greater than 225 feet.

U.S. Pat. Nos. 4,123,947 and 4,250,764 are illustrative of typical plastic sludge collector chains. These chains comprise a series of single piece, hermaphroditic links made of a synthetic resin and connected together by non-metallic pins. The chain design shown and discussed in U.S. Pat. No. 4,272,952 is similar except that the chain link is comprised of two identical half links permanently joined together. The complexly shaped links of these prior chains are made by injection molding.

The success of these previous plastic sludge collector chains has been limited because of their limited pulling strength. None of these commercial chains has an ultimate breaking strength greater than about 7,000 lbs. force, and these chains can only be used in lighter duty applications. None come close to having a strength approaching that of cast iron chain.

As mentioned variously in the aforementioned patents, persons skilled in the art heretofore recognized that higher strengths could be achieved with glass fiber reinforced resin or equivalent composites; but they were constrained in their effective use of such composites by concerns that: (a) such stronger composites cannot be molded into the complex shape of conventional sludge collector chain; (b) such composites were too highly abrasive and therefore produce excessive wear on mating parts; or (c) that any conceptually suitable composite chain design would be too costly.

The plastic chain links shown in the three aforementioned patents have in common with their predecessor cast metal chains, a complex shape including curved sidebars with widened bearing surfaces or edges intended to engage annular rims on so called "chain-saver" sprockets. The only practical method of forming synthetic resins into such intricate shapes is by molding, typically injection molding. The types of reinforcement that can be used effectively in injection molding is limited. In the case of fibers, they must be discontinuous and usually fairly short. Also, because the fibers flow with the resin in the mold, it is difficult to control their final orientation to effect maximum reinforcement.

However, the prevailing property needed in a material for the links themselves, and Particularly the sidebars, is tensile strength. In the case of fiber reinforced materials, the optimum tensile strength results when the high strength filaments are aligned parallel to the direction of pull, and particularly if the filaments are continuous.

The art of filament winding a ring or looped member to take advantage of the foregoing reinforcement principle was tried on other kinds of chain. The patentees of U.S. Pat. Nos. 3,153,898 and 3,733,811 employed a filament wound, fiber reinforced plastic to make links for an anchor chain "with a strength surpassing that of welded steel". However, this type of chain is not subject to repeated cyclical articulation between connected links, and therefore not vulnerable to wear due to the abrasiveness of the composites. Accordingly, this anchor chain technology is not readily transferable to articulating conveyor chain such as sludge collector chain.

German Patent No. 1,135,721 illustrates and discloses a sprocket driven transmission type chain having sidebars with filament wound, reinforced plastic cores. The sidebars are formed by winding filaments through a slit in a loop-shaped mold which then becomes a non-abrasive jacket for the finished link. This chain construction is not adapted to a design for sludge collector chain, as evidenced by the later issued U.S. Pat. Nos. 4,123,947; 4,250,764 and 4,272,952, which represent the practical state-of-the-art. Furthermore, as will be more apparent from the detailed description of the present invention, the method of making a chain as taught in German Patent 1,135,721 is too costly to be competitive with the chain and process taught herein.

Attention is also directed to German Patent 34 08 295 illustrating a non-metallic fiber wound chain including spacers separating the chain links from the chain pin.

Thus, despite the existence of some knowledge of using filament winding to reinforce plastic links for chain, the designers of conveyor chain, particularly sludge collector chain, struggled along until now with the material constraints imposed by their conventional wisdom dedicated to a classified configuration which required molding. They occupied themselves with improving pin characteristics or connectibility between links, and apparently conceded that a truly high strength chain of this type couldn't be made at a realistic cost.

It is therefore a principal object of the present invention to provide a chain links of consistent quality and strength for a truly high strength, non-metallic transmission or conveyor chain at a competitive cost.

It is a more specific objective of the present invention to provide a commercially affordable non-metallic chain link assembly suitable for sludge collector chain, which is stronger than any of the previously available non-metallic chains suitable for that application.

It is another object of the present invention to provide a link assembly having sidebars of a non-metallic material reinforced with high strength filamentary material oriented to maximize the tensile strength of the sidebar to yield a chain having a high strength-to-weight ratio.

It is another object of the invention to provide a plastic chain having strong and long lasting sidebars and high strength wear resistant connecting pins.

It is another object of the present invention to provide a high strength plastic chain link assembly comprising a minimum of components which is easily assembled, disassembled and/or connected to other links, without the need of special tools.

It is a still further object of the invention to provide a method of making a high-strength, non-abrasive, reinforced plastic connecting pin for a transmission or conveyor chain.

SUMMARY OF INVENTION

The foregoing and other objectives are met by a chain link assembly, made in accordance with the invention, comprising several easily assembled, design-balanced components, each with optimum properties for their respective functions in the assembled link. A pair of identical sidebars, in the form of symmetrical elongated open loops, are each made of a hardened resin reinforced with continuous, high-strength filamentary material wound in the configuration of the loop to optimize the pulling strength of the sidebar. A pin, for connecting one end of the pair of sidebars to a pair of similar sidebars in an adjacent link, comprises a cylindrical body of hardened resin reinforced with longitudinally oriented, high-strength filamentary material distributed uniformly across its cross-sectional area. As a further enhancement of its properties and function, the connecting pin is provided with a tight fitting, polymeric sleeve to provide a non-abrasive, low-friction, bearing surface. In one embodiment of the invention the polymeric sleeve is comprised of nylon including Kevlar filaments or fibers contained in the nylon. The sleeve material provides a bearing material for the chain links which is very resistant to wear and also provides low friction contact. The provision of the sleeve permits elimination of bushings and cylindrical rollers disposed about the connecting pin and between the sidebars, otherwise required to provide an interface with the sprockets used to drive the chain.

A sludge collector chain made of such link assemblies and embodying the invention is not only lightweight and resistant to corrosion, it also has fewer component parts and is easier and less expensive to assemble. The chain embodying the invention also offers the important additional advantages of significantly higher pulling strength and dimensional stability than the non-metallic chains used heretofore. Moreover the chain can be easily assembled using only a conventional tool for the retaining means.

The superior strength of the improved chain link assembly is achieved at a feasible cost in a competitive market by reason of the unique design of the sidebars and connecting pin and the methods of making them. The process for forming the sidebar comprises wetting a continuous strand or strands of high strength filamentary material with a hardenable, thermosetting, liquid resin, uniformly winding the wetted strand or strands under constant tension in a continuous loop at a substantially 90° angle to the winding axis and curing the resin to form a matrix which fixes the taut strands.

This process allows the production of a sidebar having a near perfect alignment of the filamentary reinforcement to provide maximum tensile strength. It lends itself to the production of such sidebars at a mass production rate. In addition it permits the simultaneous formation of small projections of resin on the inner surface of the sidebar. These projections serve to readily locate and longitudinally fix the chain pins to insure that the proper chain pitch is maintained even during slackened operating conditions.

The connecting pin is made by first forming a cylindrical core of hardened resin encapsulating longitudinally taut strands of high strength filamentary material, such as by a pultrusion process. Then a thin tube of low friction wear resistant polymeric material is molded, e.g. by injection molding, onto the pultruded pin core to form a sleeve which functions as a non-abrasive wear resistant low friction bearing surface. In a preferred form of the invention, nylon material including Kevlar filaments is molded onto the pin core, the Kevlar filaments providing a very wear resistant material, and the nylon matrix providing good lubricity and facilitating movement of the chain links with respect to the pin and rotation of the pin barrel with respect to the sprocket teeth.

BRIEF DESCRIPTION OF THE DRAWINGS

Having thus briefly described the invention in its broader aspects, additional advantages and features are now discussed in more detail with reference to the accompanying drawings, which form part specification, and of which:

FIG. 1 is a partially exploded isometric view, showing a chain link assembly in accordance with the present invention in both an assembled condition and an adjacent like assembly in an exploded condition to display its various components:

FIG. 2 is a side elevation view of assembled chain links, made in accordance with the present invention;

FIG. 3 is a plan view elevation of the chain links shown in FIG. 2 and with portions shown in cross-section.

DESCRIPTION OF A PREFERRED EMBODIMENT

Illustrated in FIGS. 1-3 is a chain link assembly, which is indicated generally by the numeral 10 and which consists of two identical sidebars 12 joined by a connecting pin 14, the sidebars 12 being retained on the connecting pin 14 by cotter pins 16 extending through each end of the connecting pin 14.

The sidebars 12 each have the shape of a flattened open loop having a pair of straight and parallel center sections 18 integrally connected by curved end sections 20. Each sidebar 12 is comprised of a hardened resin matrix reinforced by high tensile strength, continuous filaments which have been wound under constant tension in parallel paths around the loop. The filaments are evenly distributed across the rectangular cross-section of the sidebar. Since the loads applied on the sidebars 12 are opposed pulling forces applied at the respective curved ends 20 of the sidebar 12 generally parallel to the center sections 18, the aforementioned composite material maximizes the tensile strength of the sidebar.

It has also been demonstrated that the open loop configuration is stronger than one having a web filling the center of the loop, such as might be suggested by the molded shapes of earlier sludge collector chains, because of the reduction of stress concentration points. Uniform stress distribution in the chain links contributes to chain strength and increases fatigue life.

While the particular resin chosen for the sidebar 12 will depend on certain application and cost considerations, as well as its compatibility with the reinforcement chosen, thermosetting polyester and epoxy resins are generally preferred. Similarly, while glass filaments are probably the most affordable today, other high strength filamentary materials, such as steel, carbon or aramid, could be used if economically available. The reinforcement is preferably a strand or roving of continuous or substantially continuous filaments, and a textured strand may be used if delamination is a concern.

In one tested embodiment of the invention, a sidebar having an epoxy resin matrix with 75% to 85% by weight glass fiber reinforcement produced excellent test results and field performance.

The sidebar 12 is formed, in the manner defined in U.S. patent application Ser. No. 840,116, filed Mar. 13, 1986, also assigned to the assignee of the present invention and incorporated herein by reference. More particularly, the sidebar 12 is formed by convolutely winding the reinforcement filaments, wetted with uncured resin, under constant tension, about a mandrel until the desired width and thickness is built up. The resin is then cured to permanently fix the taut filaments in place. The winding is preferably done at a consistent near 90° angle of wind (with respect to the axis of rotation of the mandrel), and the filamentary reinforcement is nearly perfectly aligned parallel with the loop. It is an added feature of this method that by using a wide mandrel, a wide flattened filament wound tube can be formed and then sliced into predetermined widths to yield a plurality of sidebars on an economically large batch basis. This method of making filament wound sidebars lends itself to higher production rates and is clearly more economical than the process described in German Patent 1,135,721.

The curved sections 20 of the symmetrical sidebars 12 each have a semicircular inside surface for the seating of an end of the pin 14. By providing small grooves in the forming mandrel, resin is squeezed into the grooves during the winding operation. When cured, the sidebars are thus formed with integral, inwardly extending projections 26 of hardened resin which extend the interior curved surface 28 of the end section 20 to a circular arc greater than 180°. These projections 26 serve to locate and maintain the end of the pin 14 longitudinally and concentrically at the ends of the sidebar 12. This feature prevents any inadvertent variation in chain pitch such as might be occasioned by slackening of the chain and intrusion of debris between sidebar and bushing.

The connecting pin 14 consists of a cylindrical core 32 having a polymeric sleeve 34 and a pair of drilled holes 38 at its ends for receiving cotter pins 16. The core 32 is preferably a composite of a hardened thermoset resin reinforced by high strength filamentary material extending in the direction of the longitudinal axis of the core. In one preferred embodiment the core 32 of polyester resin reinforced with continuous glass filaments can be made by a pultrusion process wherein glass filaments coated with resin are pulled through a die thereby causing the glass filaments to be aligned in mutually parallel relation and causing the filaments to be compressed together to form a densified core material. Such a construction provides a very stiff and high shear resistant pin having a modulus of flexure in excess of 1.5 million pounds per square inch. The pin 14 also includes a sleeve 34 comprised of a low friction plastic material, which surrounds the core 32 to form a wear resistant coating or sleeve around the core. While the sleeve 34 could be comprised of other materials, in a preferred form of the invention, the sleeve is comprised of KEVLAR aramid fibers or filaments in a matrix of nylon resin. In one form of the invention the sleeve can be comprised of approximately 15% to 20% percent Kevlar filaments by weight and 80% to 85% nylon. Additionally, in one preferred form of the invention the sleeve 34 is formed on the pultruded pin by an injection molding process wherein the pin is placed in a mold and the nylon and Kevlar material is injection molded around the pin. The Kevlar and nylon material to be injection molded can be formed by mixing Kevlar material with sufficient amounts of injection molding grade nylon resin to produce a material having a final Kevlar fiber content of 17.5% by weight. While the Kevlar and nylon material to be molded could include a greater percentage of Kevlar filaments, increased amounts of Kevlar makes injection molding more difficult.

In the illustrated arrangement sleeve 34 includes an integral central barrel portion 35 adapted to engage the sprocket teeth, the central barrel portion of the sleeve having a material thickness greater than the material thickness of the opposite ends 37 of the sleeve, and the opposite ends 39 of the central portion 35 of the sleeve define shoulders adapted to be engaged by the sides of an inner pair of sidebars 12, the shoulders 39 and barrel portion 35 maintaining the sidebars 12 in spaced apart relation. Because the nylon and Kevlar material forming the central barrel portion 35 of the sleeve is wear resistant and has good lubricity, the barrel tends to resist wear as a result of contact with a sprocket. The lubricity of the pin sleeve material facilitates rotation of barrel/pin assembly thereby distributing wear evenly around the full periphery of the pin and prevents concentrated wear points and resulting shortened life. In a preferred form of the invention the material forming sleeve 34 will have a thickness sufficient to accommodate some wear of the sleeve and also to permit injection molding of the sleeve. On the other hand the thickness of the material of the sleeve should be minimized because the resistance of the pin to flexing or bending is proportional to the cube of the diameter of the pultruded core of the pin and it is accordingly desired that the core have a diameter as large as possible within the limits of the size of the chain links.

The link assembly further includes means for retaining the sidebars 12 on the ends of the pins 14. In the illustrated embodiment this retaining means comprises a pair of cotter pins 16. A variety of other well known retaining means could be substituted for the cotter pins 16; but preferably they should also be of a non-corrodible material such as stainless steel or even plastic.

An important feature and advantage of the invention is the ease with which the various components just described can be assembled to make the chain links 10 illustrated in FIGS. 1 and 2. Two pairs of sidebars 12 can be slid onto the ends of a pin 14 without need of any tool. The cotter pins 16 are inserted through the holes 38 at the ends of the pin, and the bifurcated ends of the cotter pins 16 are expanded. The ease of assembly of these chain links is of valuable benefit to installers or maintenance personnel who may have to make or break a connection under difficult conditions and without the requirement of special tools.

But even more important are the improved performance features of the link assembly 10. Paramount among them is the substantially greater pulling strength provided by the sidebars 12 in combination with the connecting pins 14. The greatly increased tensile strength of the sidebars 12 is complemented by the structure of the connecting pins 14 which, because of its longitudinal or axial reinforcement, has a high modulus of flexure, in excess of 1.5 million psi. As a result, the pins 16 do not readily bend or deform under the high tensile loads, and thus prevent a misalignment of the sidebars 12 which has lead to failure problems in certain prior art chains.

None of the commercially available plastic sludge collector chains of the prior art have shown by test to have an ultimate strength in tension greater than 7,000 lbs. force or rated operating strength greater than about 2,600 lbs. force. However, the chain described above as a practical embodiment of the invention, and which was of comparable size and similar geometry to the prior art chains, has shown by the same test to have an ultimate strength of nearly 40,000 lbs. Because of its strength, this chain is expected to have a working rating of 6000 lbs. force, which is greater than that of cast iron chains. Therefore, unlike the prior art plastic chains, chains embodying the invention can be used in large sewage treatment tanks and in even the most severely loaded sludge collector applications. Also, since the improved chain link is comprised essentially of lightweight plastic and reinforced plastic composite components, the resulting chain has a very high strength-to-weight ratio which results in further savings in the drives, sprockets and structural support systems used with it.

It is another very important feature of the invention that the continuous taut reinforcement of the sidebars 2 provides extremely high resistance to creep and rigidity. This minimizes stretching of the chain during operation under load and reduces the need for costly and inconvenient adjustments.

It is another important feature of the invention that it facilitates a balanced design. By varying certain dimensional parameters of each component, they can all be designed to carry the same design load. This is in contrast to many prior art chains wherein one or more components is overdesigned or unnecessarily strong in relation to the weaker components with which it is associated.

It is still another important benefit of the invention, that owing to the optimized design of each of its components, a chain comprised of links assemblies embodying the invention is expected to have longer economic life than its predecessors.

We claim:
1. A non-metallic chain link assembly comprising
   a plurality of chain sidebars, each sidebar comprising a flattened loop including a pair of elongated substantially linear links joined at their opposite ends by smoothly curved end sections and each sidebar being formed by winding a high strength filamentary material on a mandrel and under tension, and the filamentary material being fixed, in a matrix of resin hardened after winding of the filamentary material on the mandrel, and the sidebars each having planar side surfaces and the curved end sections each defining a generally semicircular internal surface, and
   at least one generally cylindrical connecting pin for connecting the ends of a first pair of sidebars to the ends of a second pair of sidebars, the cylindrical connecting pin including a core comprised of a high strength material and a sleeve surrounding said core, said sleeve being comprised of a wear resistant low friction polymeric material and said cylindrical connecting pin having opposite ends, one end supporting the ends of a first pair of sidebars, in side-by-side relation and an opposite end of the cylindrical connecting pin supporting the ends of a second pair of sidebars.

2. A non-metallic chain links assembly as set forth in claim 1 wherein said core has a longitudinal axis and is comprised of high strength filamentary material in a matrix of resin, the filamentary material and resin material being pulled through a die and the filamentary material being oriented parallel to the longitudinal axis of the core.

3. A non-metallic chain link assembly as set forth in claim 1 wherein said sleeve surrounding said core is comprised of resin including Kevlar filaments.

4. A non-metallic chain link assembly as set forth in claim 1 wherein said sleeve includes a central barrel portion having opposite ends defining shoulders, the shoulders at the opposite ends of the barrel portion being adapted to engage a pair of sidebars to hold the sidebars in spaced apart relation.

5. A non-metallic chain link assembly as set forth in claim 1 wherein the chain sidebars each include flat surfaces and wherein the flat surfaces of a pair of chain sidebars mounted on one end of a chain pin are positioned in face-to-face engaging relation.

6. A non-metallic chain as set forth in claim 5 wherein generally semicircular internal surface of the curved end sections of the sidebars each engage the surface of the sleeve and are supported on the sleeve for movement with respect to the cylindrical connecting pin.

7. A non-metallic chain as set forth in claim 1 wherein the generally semicircular internal surface of the curved end sections of the sidebars each engage the surface of the sleeve and are supported on the sleeve for movement with respect to the cylindrical connecting pin.

8. A method for making a non-metallic chain link assembly comprising forming a chain sidebar by providing a continuous strand of high strength filamentary material mixed with an uncured resin, uniformly winding the strand under tension around a mandrel to form an elongated open loop configuration having symmetrical and identical curved ends and curing said resin to form a matrix fixing said strand in said taughtly wound configuration;

forming a high strength non-abrasive connecting pin by forming a cylindrical core of longitudinally taut strands of high strength filamentary material encapsulated in a matrix of hardened resin, the cylindrical core having a cylindrical surface and covering the cylindrical surface of the cylindrical core with a layer of non-abrasive wear resistant material; and mounting the chain sidebar on one end of the connecting pin such that one of the curved ends of the chain sidebar is supported by the layer of non-abrasive wear resistant material.

9. A method as set forth in claim 8 wherein the step of covering the cylindrical surface of the cylindrical core with non-abrasive wear resistant material includes the step of injection molding a polymeric material around the cylindrical core, the polymeric material including Kevlar filaments.

10. A method as set forth in claim 8 wherein the connecting pin has opposite ends, and wherein the step of mounting the chain sidebar includes mounting a first pair of sidebars on one end of the connecting pin, the sidebars being in side-by-side engaging relation and mounting a second pair of sidebars on an opposite end of the connecting pin in side-by-side engaging relation.

* * * * *